United States Patent [19]

Guerra

[11] Patent Number: 5,442,443
[45] Date of Patent: * Aug. 15, 1995

[54] STEREOSCOPIC PHOTON TUNNELING MICROSCOPE

[75] Inventor: John M. Guerra, Concord, Mass.

[73] Assignee: Polaroid Corporation, Cambridge, Mass.

[ * ] Notice: The portion of the term of this patent subsequent to Sep. 20, 2011 has been disclaimed.

[21] Appl. No.: 44,396

[22] Filed: Apr. 8, 1993

[51] Int. Cl.$^6$ ............................................. G01N 21/17
[52] U.S. Cl. ..................................... 356/376; 356/371
[58] Field of Search .............. 356/372, 375, 376, 128, 356/371; 250/216, 306, 227.26, 309, 310, 311, 307; 359/368, 369, 373, 374, 375, 385, 389, 376, 377, 378

[56] References Cited

U.S. PATENT DOCUMENTS

| | | | |
|---|---|---|---|
| 3,975,084 | 8/1976 | Block | 356/338 |
| 4,353,618 | 10/1982 | Hegnee et al. | 359/368 |
| 4,662,747 | 5/1987 | Isaacson et al. | 356/317 |
| 4,681,451 | 7/1987 | Guerra et al. | 356/373 |
| 4,889,988 | 12/1989 | Elings et al. | 250/306 |
| 4,917,462 | 4/1990 | Lewis et al. | 250/216 |
| 4,971,445 | 11/1990 | Sato et al. | 356/376 |
| 5,018,865 | 5/1991 | Ferrell et al. | 356/376 |
| 5,083,022 | 1/1992 | Miyamoto et al. | 250/306 |
| 5,349,443 | 9/1994 | Guerra | 356/376 |

Primary Examiner—Hoa Q. Pham
Attorney, Agent, or Firm—Francis J. Caufield

[57] ABSTRACT

A system operative with photon tunneling microscopy presents an image on a two-dimensional display which is perceived as a three-dimensional presentation by a person viewing the display. An optical image of the subject produced by the microscope is scanned by means of a television vidicon which converts the optical signal to an electric signal representing depth of a surface feature. The electric signal is outputted to the display wherein the image is presented as a set of line scans parallel to the horizontal axis of the display, and wherein the magnitude of the electric signal is plotted on the vertical axis of the display. A variable delay is introduced to be either increased or decreased stepwise between successive ones of the line scans. This results in a tilting of the presentation to the right or the left. Two tilted views are presented simultaneously, one to one eye and one to the other eye of an observer, to give a perception of a three-dimensional view. A flexible optical transducer between the subject and an objective lens provides a conformal fitting of the microscope to the subject. A film of oil is placed between and contiguous the lens and the flexible optical element to provide continuity of optical path. The transducer is provided with a scale formed as a depression in its surface and having a sequence of steps which serves as a measure of height of topographical features on the subject.

5 Claims, 6 Drawing Sheets

STEREOSCOPIC PHOTON TUNNELING MICROSCOPE

BACKGROUND OF THE INVENTION

This invention relates to optical imaging of submicron surface features by use of a microscope objective employing total internal reflection modified by partial coupling of radiant energy to the subject surface via an evanescent mode of energy propagation to obtain variations in received signal levels corresponding to variations in surface height, the signal amplitudes being presented as a y-axis deflection upon an x-y display wherein each of a plurality of x scan lines represent a strip of the subject surface to form the likeness of a three dimensional view of the surface.

There is a need to measure very fine surface details in a variety of disciplines ranging from the production of magnetic recording media to the biological examination of living cells, by way of example. In the case of the magnetic media, variations in surface height or deviations from planarity are of interest, while in studies of a cell from biological subject matter, differences in the density of the biological material of the cell are of interest. One technique for viewing minute details at the subject surface or within a shallow region beneath the surface, within a fraction of the optical wavelength, employs a microscope objective placed within approximately one wavelength of the subject in conjunction with inclined rays of illuminating light to provide internal reflection within the objective as is disclosed in Guerra et al., U.S. Pat. No. 4,681,451. Since photons are able to propagate across the gap between the lens and the subject, this form of microscopy is often referred to as photon tunneling microscopy. Such microscopy is described also in an article Photon Tunneling Microscopy by J. M. Guerra in APPLIED OPTICS, Sep. 10, 1990, pages 3741-3752. Therein, the subject is spaced apart from the objective lens at a spacing which is so small that a fraction of the optical energy is coupled to the subject via evanescent mode propagation resulting in a partial frustration of the total internal reflection at the lens. There results a variation in intensity of received optical signal, the variation in intensity being representative of variations in spacing between the subject and the lens.

While the apparatus and methodology of the foregoing patent are successful in obtaining surface data, there is a need for a mode of data presentation which enables a viewer of the subject matter to visualize better the topography of the subject surface as well as details in a shallow region below the surface. An improved mode of data presentation would allow the viewer to recognize patterns representative of surface undulations and/or variations in the density or optical characteristics of the subject. Such patterns, if presented with a likeness of a three-dimensional presentation would be most useful to an engineer, in the case of the magnetic medium, for evaluating the suitability of the magnetic media for recording apparatus, or for a pathologist, in the case of the biological cell, for diagnosing an ailment.

SUMMARY OF THE INVENTION

The aforementioned need for an improved presentation, as well as other advantages, are provided by a system operative with photon tunneling microscopy to provide, in accordance with the invention, a presentation on a two-dimensional display which is perceived as a three-dimensional presentation by a person viewing the display. In accordance with the invention, a photon tunneling microscope provides an optical signal varying in intensity as a function of depth of a surface feature, as measured in distance from an objective lens of the microscope. An optical image of the subject produced by the microscope is scanned by means of a television vidicon which converts the optical signal to an electric signal representing depth of a surface feature. The electric signal is outputted to the display wherein the image is presented as a set of line scans parallel to the horizontal, or x, axis of the display, and wherein the magnitude of the electric signal is plotted on the vertical, or y, axis of the display. The set of line scans collectively present the surface of the subject, while deviations of each line scan in the y direction provides data of surface features of the subject.

By introducing a fixed delay from a horizontal synchronization signal of the display, the entire presentation on the display is shifted to the right, assuming that each line is scanned from left to right, as is customary. In accordance with the invention, the fixed delay is converted to a variable delay wherein the delay is either increased or decreased stepwise between successive ones of the line scans. This results in a tilting of the presentation. Increasing the delay tilts the presentation to the right, and decreasing the delay tilts the presentation to the left. The amount of tilt is proportional to the size of the step in the increments or decrements of the delay.

A tilting of the presentation to the right gives the impression that the subject is being viewed partially from the right side, and a tilting of the presentation to the left gives the impression that the subject is being viewed partially from the left side. Advantage is taken of these impressions by simultaneously presenting both views to a person viewing the displayed image. In one embodiment of the invention, two separate displays are employed with one display having the presentation tilted to the right and the other display having the presentation tilted to the left. The left-tilted presentation is applied to the right eye of the viewer, and the right-tilted presentation is applied to the left eye of the viewer. The viewer perceives a three-dimensional perspective view with a vanishing point located by the amount of the right tilt and the amount of the left tilt. In a second embodiment of the invention, a single display is employed wherein the view is alternated rapidly between the right-tilt presentation and the left-tilt presentation at a rate faster than the eye flicker rate, and wherein the viewer is provided with a pair of shutters operated in synchronism with the alternation of the presentations allowing the right eye to see only the left-tilt presentation and the left eye to see only the right-tilt presentation. The viewer perceives the same three-dimensional perspective view with the second embodiment as with the first embodiment.

In the displayed image, details in the surface of the subject are based on variations in intensity of light propagating from the microscope objective to the vidicon. There are two sources for the variation of optical intensity. One source is a variation in distance between lens and subject which produces a variation in the magnitude of the optical signal which decreases exponentially with increasing distance. The second source is a variation in optical absorption by different regions of the subject, as in the case of a subject biological cell. The presentations of the image on the display are based only on the intensity of the received optical signal and, therefore, do not indicate whether the displayed data represents topographical surface features or light absorptive surface features. However, in practice, this is known ahead of time by an operator of the system of the invention. Uniform material such as magnetic recording media results in the presentation of a topographic view. Biological subject matter in liquid or gelatinous form is provided with a uniform spacing from the objective lens, and results in the presentation of a view of light absorptive characteristics of components of the subject.

In the construction of the invention, in accordance with an important feature of the invention, it is advantageous to employ a flexible optical element between the subject and the objective lens. The flexible optical element has a surface harder than the subject so as to provide a conformal fitting of the flexible optical element to the subject, thereby to attain uniform spacing between the flexible optical element and the subject. A film of oil is placed between and contiguous the lens and the flexible optical element. The oil, the lens, and the flexible optical element have substantially equal indices of refraction so that the flexible plate may be regarded as an extension of the objective lens. This provides greater accuracy in the displaying of the topographic features of the subject.

In accordance with yet a further feature of the invention, it is advantageous to construct the flexible optical element with a scale formed as a depression in a surface of the element facing a subject to be viewed, the depression comprising a sequence of steps which affects the amount of energy withdrawn by the evanescent mode to provide an image of a staircase. The scale is thus a measure of height, or depth, of topographical features on the surface of the subject being viewed. The scale is located at a point of convenience, such as to the side of the imaged area, so as to allow presentation of the image in conjunction with the scale, or separate from the scale.

BRIEF DESCRIPTION OF THE DRAWING

The aforementioned aspects and other features of the invention are explained in the following description, taken in connection with the accompanying drawing wherein.

DETAILED DESCRIPTION

Figure 1:
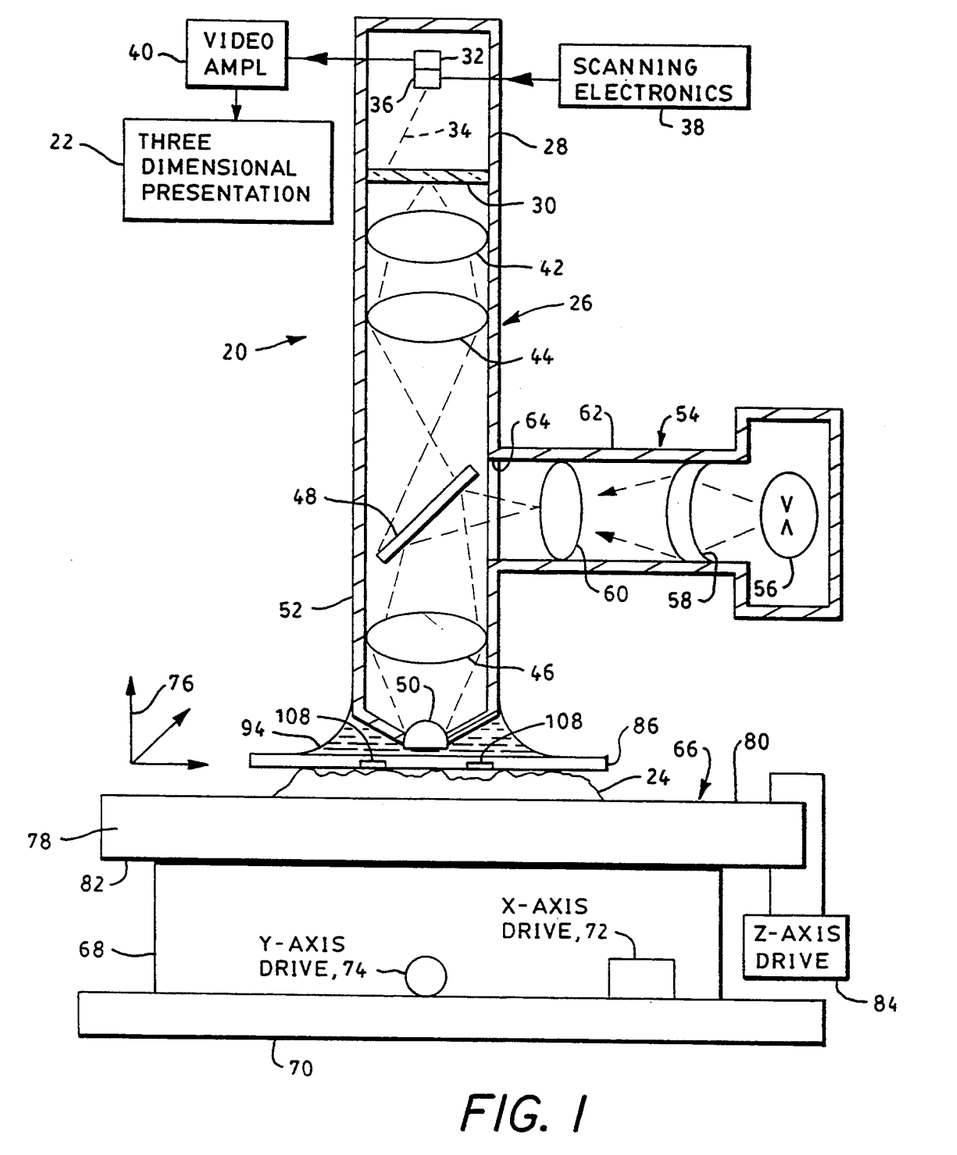
FIG. 1 shows diagrammatically, and in longitudinal section, the configuration of a photon-tunneling microscope with other components of a microscopy system for producing a three-dimensional presentation of an image of a subject viewed by the microscope.

FIG. 1 shows a photon tunneling microscopy system 20 having electrical circuitry 22 for providing a three-dimensional presentation of an image of a subject 24. The system 20 includes a photon-tunneling microscope 26 coupled to a television vidicon 28. The microscope 26 views the subject 24 to obtain an image thereof, the image being formed on a photosensitive face 30 of the vidicon 28. The vidicon 28 is constructed in a well-known form, and includes an electrode assembly 32 for generating an electron beam 34, and a beam focusing unit 36 which focuses the beam 34 upon the face 30, and scans the beam 34 across the face 30 in response to electronic signals provided by a scanning electronics unit 38. Electric current in the beam 34 is modulated in a well-known fashion by electrically-charged regions on the face 30 produced by the presence of the image on the face 30, the modulation of the beam current occurring during a scanning of the beam 34 across the image. A video amplifier 40 coupled to the electrode assembly 32 extracts a modulation signal from the beam 34 and applies the signal to the circuitry 22 for generation of the three-dimensional presentation of the image in a manner to be described hereinafter.

The microscope 26 includes lenses 42 and 44 representative of a first lens group, a lens 46 representative of a second lens group, and a beam splitter 48, such as a half-silvered mirror, disposed between the lenses 44 and 46. An objective lens 50 is located between the lens 46 and the subject 24, the objective lens 50 comprising a plano-convex lens wherein the planar surface faces the subject 24, and the convex surface faces the lens 46. The microscope 26 includes a housing 52 which supports the foregoing lenses 42, 44, 46, and 50 and the beam splitter 48 in their respective positions, the objective lens 50 being located at a front end of the housing 52, and the vidicon 28 being mounted to the back end of the housing 52, opposite the objective lens 50.

The subject 24 is illuminated with light provided by a light source 54 which includes a lamp 56 radiating noncoherent light via a collimating lens group represented by lenses 58 and 60. The light source 54 includes a housing 62 which supports the lamp 56 and the lenses 58 and 60. Light of the lamp 56 is directed by the lenses 58 and 60 through an aperture 64 in the microscope housing 52 to impinge upon the beam splitter 48, the beam splitter 48 directing a portion of the light via the lenses 46 and 50 to illuminate the subject 24.

The subject 24 is supported upon a stage 66 which rests upon a servo unit 68 connected to a base 70. The servo unit 68 includes an X-axis drive 72 and a Y-axis drive 74 which are operative to translate the stage 66 in a horizontal plane relative to the base 70. X, Y, and Z coordinate axes are indicated at 76. The stage 66, if desired, may be fabricated of a piezoelectric material 78 disposed between upper and lower electrodes 80 and 82 for displacing the subject 24 in the Z direction. A Z-axis drive 84 comprises electric drive circuitry (not shown) for applying a voltage between the electrodes 80 and 82 to provide for contraction and expansion of the piezoelectric material 78 for lowering and for raising the subject 24 relative to the base 70. Operation of the three drives 72, 74, and 84 serve to position a desired region of the subject 24 in front of the objective lens 50 to enable a viewing of the region of the subject 24 by the microscope 26.

Figure 2:
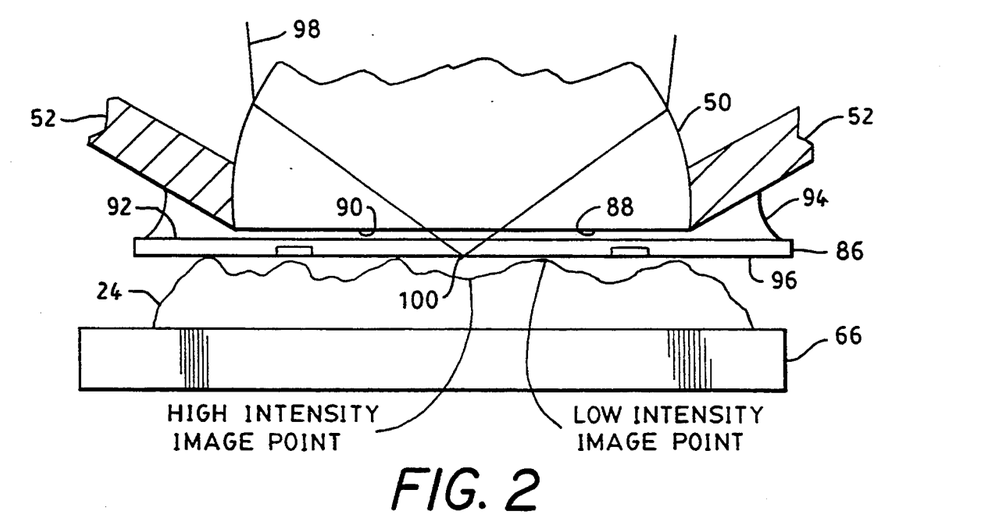
FIG. 2 is an enlarged diagrammatic view of an interface between an objective lens of the microscope of FIG. 1 and subject matter being viewed by the microscope.

As shown in FIGS. 1 and 2, a transducer 86 is disposed between the subject 24 and the objective lens 50. There is a small gap 88 between the planar surface 90 of the objective lens 50 and a top surface 92 of the transducer 86. The gap 88 is filled with a transparent liquid 94, such as an oil, which has an index of refraction approximately the same as that of the lens 50, and insures continuity of optical path between the lens 50 and the transducer 86. The transducer 86 is fabricated of a plate or film of transparent material, and has an index of refraction approximately equal to the indices of refraction of the liquid 94 and the lens 50. The transducer 86 may be placed in contact with, or spaced apart slightly from, high spots in the upper surface of the sample 24. Low spots in the upper surface of the sample 24 are spaced apart from a bottom surface 96 of the transducer 86.

The objective lens 50 is constructed with a numerical aperture in the range of 1.00 to 1.25 to provide for total internal reflection (TIR) of the illumination from the lamp 56 in the situation wherein the planar surface 90 is immersed in the liquid 94. This is demonstrated in FIG. 2 wherein a ray of light 98 is refracted at an interface with the convex surface of the lens 50 and, thereafter, travels along a substantially straight path to the bottom surface 96 of the transducer 86. The straightness of the path is due to the substantial matching of the indices of refraction of the materials of the lens 50 and the transducer 86 with the liquid 94. The angle of incidence of the ray 98 with the bottom surface 96 is such that total internal reflection occurs, whereupon the ray 98 is again refracted at the convex surface 50 to propagate back towards the lens 46 (FIG. 1). The reflected light passes, in part, through the beam splitter 48 to be focused by the lenses 42 and 44 upon the face 30 of the vidicon 28. This form of illumination of the subject 24 is known as Kohler illumination. Internal surfaces of the microscope housing 52 have a black nonreflecting finish.

The total internal reflection at point 100 produces an evanescent mode of propagation of radiation towards the subject 24. Assuming that there is a spacing between the subject 24 and the point 100 of significant distance, such as in the range of two wavelengths of the radiation, then the TIR is essentially complete. However, for a spacing between the point 100 and the subject 24 which is less than one wavelength of the radiation, there is sufficient interaction between the evanescent field and the material of the subject 24 to absorb a fraction of the energy of the radiation. This reduces the intensity of the reflected portion of the ray 98. Thus, in the image at the vidicon face 30, there is relatively low intensity of image points corresponding to high spots in the surface of the subject 24, and relatively high intensity at image points corresponding to relatively low regions in the surface of the subject 24.

In accordance with an aspect of the invention, the transducer 86 is constructed as a flexible plate or film. By way of example, the transducer 86 may be formed as a film of collodion, this being a solution of cellulose in amyl acetate. The film should be at least 10 microns thick to allow the film to cling to a surface of the sample 24. By way of example, the transducer 86 may be prepared in advance of the use of the microscope 26 by placing a drop of collodion on a plastic or glass substrate 102 (FIG. 5) and, after the collodion has dried, the resulting film may be peeled off of the substrate 102 to serve as the transducer 86. By way of example, the substrate 102 may have a square shape measuring two inches on a side to facilitate transportation of the transducer 86 from a location of storage to the location of the microscope 26.

Figure 3:
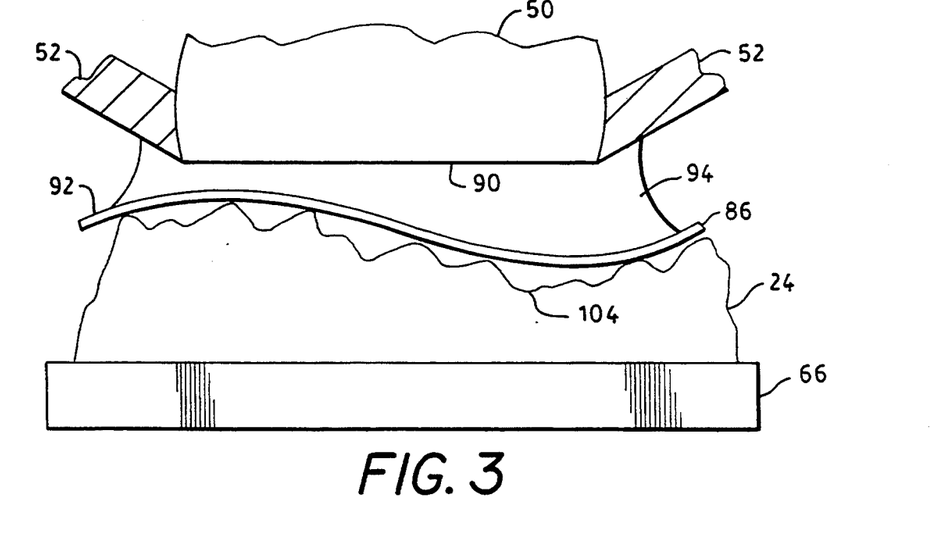
FIG. 3 is a view similar to that of FIG. 2, but demonstrating curvature of a transducer plate at an interface between microscope and subject.

FIG. 3 demonstrates an advantage in the use of the flexible transducer 86. The transducer 86 conforms to relatively large undulations in the surface of the sample 24 while being sufficiently rigid to extend across the peaks of relatively small irregularities in the surface of the sample 24. The curving of the transducer 86 in FIG. 3 has been exaggerated to demonstrate the capacity for flexing. It is understood that, in practice, the amount of flexing is relatively small so as to retain the capability of total internal reflection by the composite objective element comprising the lens 50 plus the liquid 94 plus the transducer 86. The flexing of the transducer 86 increases the accuracy in which data of the surface features of the subject 24 can be obtained. If the transducer 86 were totally rigid, then large depressions which might extend over a major portion of the subject 24 would be too far from the transducer 86 to extract a meaningful amount of energy from the evanescent wave so that surface detail would be lost at the location of the large depression. One such large depression is indicated at 104 in FIG. 3. The liquid 94, by virtue of its capacity to flow about the top surface 92 of the transducer 86 and the planar surface 90 of the lens 50, maintains uniformity of optical propagation path between the lens 50 and the transducer 86 even in the presence of the flexing of the transducer 86.

Figure 4:
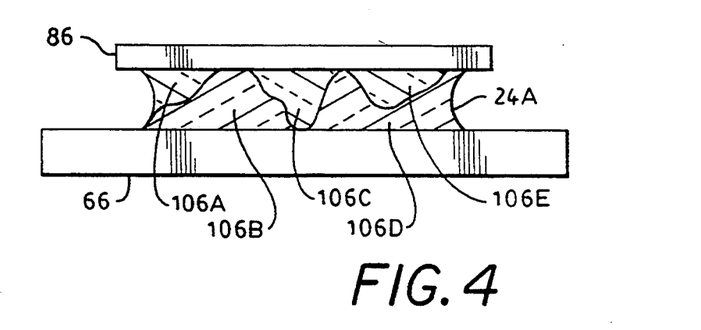
FIG. 4 shows an interface between a transducer plate and a gelatinous subject supported by a stage of FIG. 1.

In accordance with a further feature of the invention, as illustrated in FIG. 4, it is noted that a gelatinous form of subject 24A may be viewed by the microscope 26 by placing the subject 24A between the transducer 86 and the stage 66. By way of example, the subject 24A may comprise a cell of a living organism. Due to the gelatinous or liquid nature of the subject 24A, the top surface of the subject 24A adheres to the transducer 86 presenting a flat upper surface of the subject 24A to the microscope 26. Herein, a portion of the energy of the illuminating light is absorbed by the material of the subject 24A resulting in a significant drop in the TIR. However, the amount of the absorption of the illuminating radiant energy by the subject 24A varies from location to location of the subject 24A due to differences of material in the subject. By way of example, five regions of the subject 24A are shown in FIG. 4, these regions being identified as 106A-E. One of these regions 106A-E may be the nucleus of a cell. Due to variations of absorption of the illuminating radiation, an image is produced on the vidicon face 30, the image showing outlines of the various regions 106A-E of the subject 24A.

Figure 5:
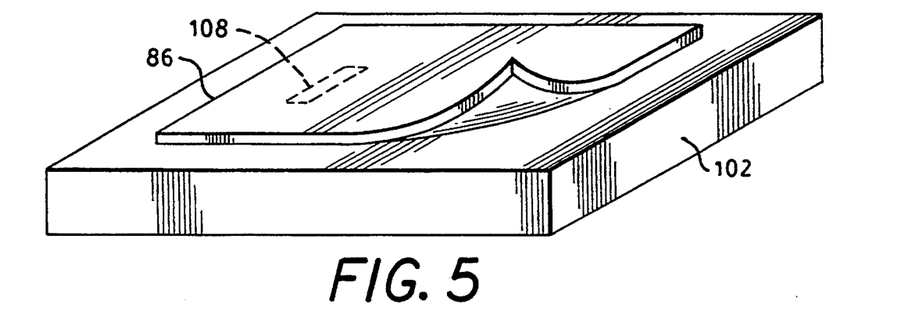
FIG. 5 is a stylized view of a transducer, configured as a film, stored upon a substrate.
Figure 6:
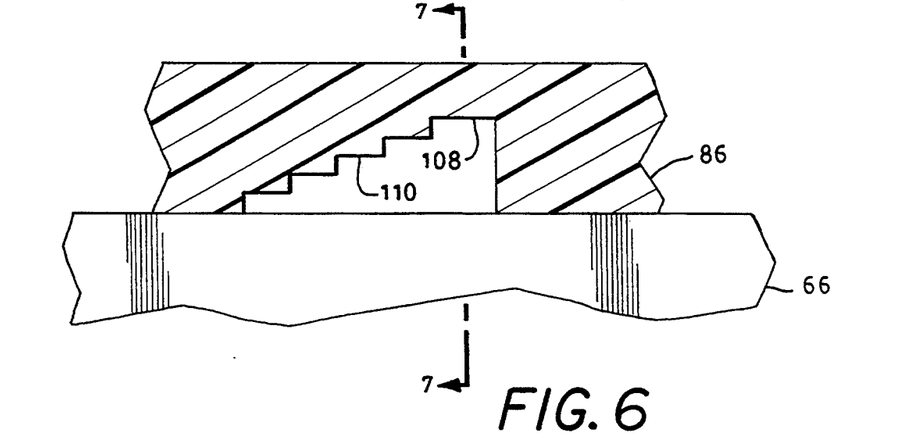
FIG. 6 is a fragmentary sectional view of the transducer film of FIG. 5 showing details of a calibrating staircase depression formed within a bottom surface of the transducer film.
Figure 7:
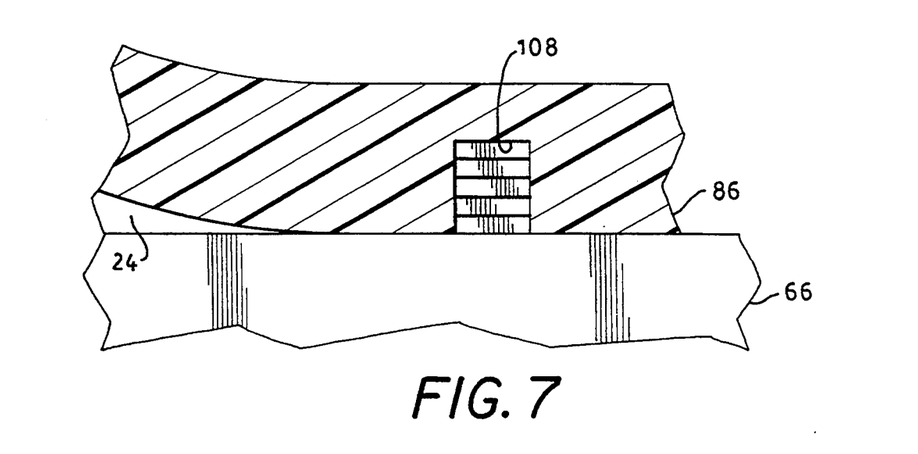
FIG. 7 is a sectional view taken along the line 7—7 in FIG. 6 and showing the calibrating depression of the transducer film, FIG. 7 also showing an edge of a subject spaced apart laterally from the depression.

In accordance with a further feature of the invention and as shown in FIGS. 5, 6, and 7, the transducer 86 may be embossed with a depression 108 on the bottom surface 96 of the transducer 86. The depression 108 is configured as a staircase 110 to serve as a means for calibrating the microscopy system 20 with respect to depth, or height, of features in the surface of the subject 24. Preferably, the depression 108 is located off to the side of the subject 24 (FIG. 7) at a location wherein the bottom surface 96 of the transducer 86 can abut the stage 66. Then, upon a viewing of the depression 108 by the microscope 26, the total internal reflection occurs from the staircase 110 rather than from the bottom surface 96 of the transducer 86. The staircase introduces a stepwise variation in the distance between the surface of the depression 108 and the stage 66. This results in a stepwise absorption of energy from the evanescent mode and the production on the vidicon face 30 of an image having a stepwise variation in intensity. The intensity is an indication of the depth of each step of the staircase 110 and, thereby, serves as a measure of depth. In this way, the depression 108 serves to calibrate the microscopy system 20. In fact, by placing the depression 108 off to the side of the subject 24, a user of the microscope 26 can have concurrent calibration and viewing of the subject by simply translating the stage 66 in the horizontal plane, transverse to a central vertical axis of the microscope 26. By way of alternate method of construction of the calibrating depression 108, it is noted that the depression 108 can be constructed by a molding process in which a staircase (not shown) is constructed in the top surface of the substrate 102 prior to the deposition of the drop of collodion thereon, during the fabrication of the transducer 86.

Figure 8:
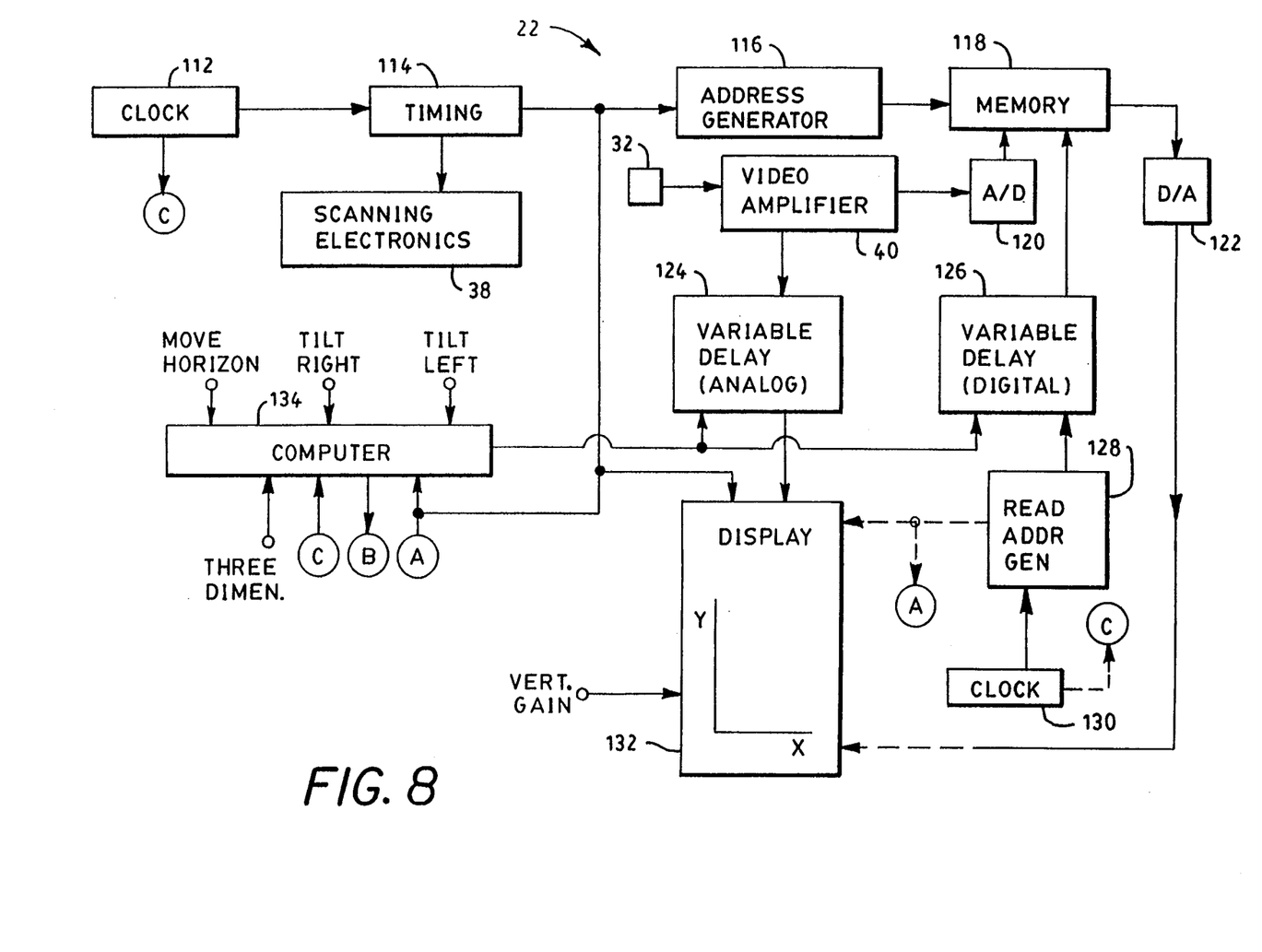
FIG. 8 is a block diagram of circuitry employed in the microscopy system of FIG. 1 for providing tilting of an image and for the generation of a three-dimensional presentation of an image.

FIG. 8 shows details of the circuitry 22 (FIG. 1) which provide a three dimensional presentation of an image of the subject 24 from image data provided by the video amplifier 40. The circuitry 22 includes a clock 112, a timing unit 114, an address generator 116, a memory 118, an analog-to-digital converter 120, a digital-to-analog converter 122, a variable delay unit 124 of analog construction, a variable delay unit 126 of digital construction, an address generator 128, a clock 130, a display 132, and a computer 134.

In operation, the circuitry 22 provides both for the real-time generation of the three-dimensional presentation of the image upon the display 132 in analog format, and the generation of a stored digital representation of the image for subsequent three-dimensional presentation upon the display 132. In the case of the real-time analog presentation, the clock 122 applies a set of clock pulses to the timing unit 114 for generating, in well-known format, a sequence of timing signals which strobe the scanning electronics 38 to scan the beam 34 (FIG. 1) across the vidicon face 30. Timing signals produced by the timing unit 114 are also applied to the display 132 to produce scan lines thereon in synchronism with scan lines upon the vidicon face 30. The scan lines in the display 132 are oriented in the X direction. Scanning can be accomplished by beginning with the bottom scan line with the next scan line being displaced from the bottom scan line in the Y direction, further scan lines being positioned sequentially above the preceding scan lines. Alternatively, scanning can begin with the top scan line in the display 132, with succeeding scan lines being displaced therefrom in the negative Y direction. By way of example, in explaining the operation of the invention, it is presumed that the first scan line to be portrayed is the bottom scan line, and that subsequent scan lines are displaced therefrom in the positive Y direction. The scanning is presumed to be from right to left.

Figure 9:
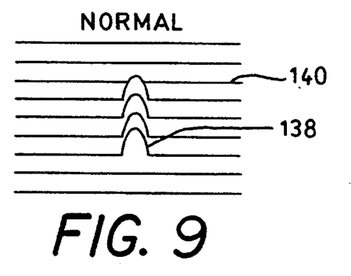
FIGS. 9, 10, and 11 show, respectively, diagrammatic representations of a set of scan lines for a normal presentation of an image, a right-tilted presentation of the image, and a left-tilted presentation of the image in an X-Y coordinate system wherein the X axis is parallel to a scan line, and the Y axis provides for deflections of the scan representative of surface features of a subject.
Figure 11:
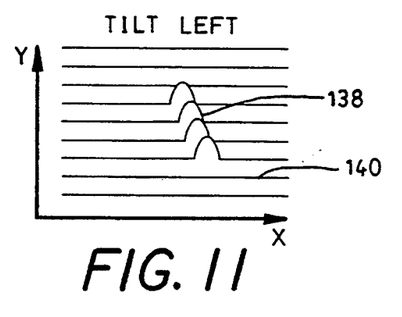
Figure 12:
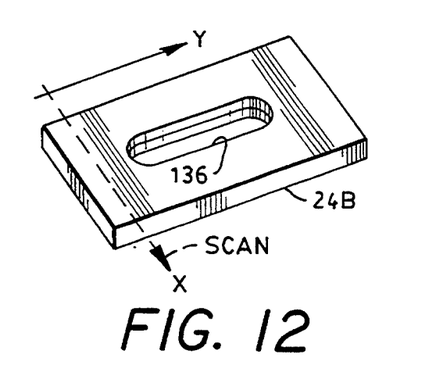
FIG. 12 is a stylized perspective view of a fragmentary portion of a subject having a trough in a surface facing the microscope, the trough of FIG. 12 being the subject of the image of FIGS. 9–11.

In accordance with a feature of the invention, with each scan line, image data is outputted by the video amplifier 40 through the variable delay unit 124 to the display 132 for presentation in the respective scan lines upon the display 132. To facilitate the description of the operation, it is presumed, by way of example, that a region of interest in a subject 24B, shown in FIG. 12, is provided with a trough 136 in a top surface of the subject 24B facing the transducer 86 (FIG. 2). For a normal presentation on the display 132 of an image of the subject 24B, the delay unit 124 applies a fixed amount of delay for each of the scan limes of image data, as shown by the horizontal trace in the graph of FIG. 13. The resulting presentation on the display 132 is shown in FIG. 9 wherein there are vertical deflections 138 in respective ones of scan lines 140 passing through the region of the trough 136. Scan lines 140 passing both above and below the trough 136 of FIG. 12 are free of deflections 138. An X axis and a Y axis are superposed upon the subject 24B in FIG. 12 to show the directions and locations of the various scan lines relative to the trough 136. As has been noted above, a depression in the upper surface of the subject results in increased intensity to an image on the vidicon face 30 and, accordingly, the deflections 138 extend in the positive Y direction, as indicated by the X-Y coordinate axes of FIG. 11. In the case of a protrusion upwardly from the surface of the subject, there would be a deflection, (not shown) of a scan line 140 in the negative Y direction. If desired, in the operation of the display 132, the sense of the deflection 138 can be reversed so that a depression in the top surface of the subject is represented as a deflection in the negative Y direction, with a protrusion in the top surface of the subject being represented by a deflection in the positive Y direction.

Figure 10:
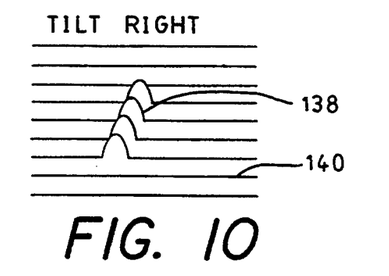
Figure 13:
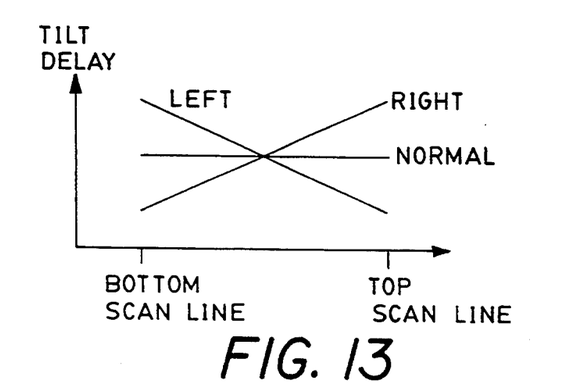
FIG. 13 is a graph showing a relationship between delays imparted between scan lines and a tilting of an image as presented in FIGS. 9–11.

The invention provides for creation of the three-dimensional presentation by a tilting of the image on the display 132 to the right and by a tilting of the image to the left. FIGS. 9, 10, and 11 show, respectively, a normal presentation of the image on the display 132 in the absence of tilt, a presentation of the image with a tilt to the right, and a presentation of the image with a tilt to the left. The normal image is produced as described above. The tilting to the right is accomplished by activating the delay unit 124 to provide a minimum amount of delay for the first scan line at the bottom of the image, a greater delay in the presentation of the next scan line immediately above the first scan line, with increasing amounts of delay being applied monotonically to successive ones of the scan lines. The increasing amounts of delay are represented, in the graph of FIG. 13, by the line identified right which slopes upwardly to the right. The computer 134 generates a control signal which is applied to the delay unit 124 for designating the amount of delay for each of the scan lines. Synchronization of the computer 134 with the scanning process is accomplished by feeding timing signals from the timing unit 114 to the computer at terminal A, and by coupling clock pulses from the clock 112 to the computer 134 via terminal C. As shown in FIG. 10, the tilting to the right produces a presentation of the image in which a deflection 138 in an upper one of the scan lines 140 occurs later in time than the time of occurrence of a deflection 138 in a lower one of the scan lines 140. A person perceives the succession of deflections 138 as a tilted image of the trough 136. The left-tilting of FIG. 11 is accomplished in the same fashion by directing the delay unit 124 to impart a maximum delay to the bottom scan line and a minimum delay to the top scan line as indicated in the graph of FIG. 13 by the line identified left.

The computer 134 is provided with a set of input controls allowing a person operating the microscopy system 20 to select a mode of presentation of the image on the display 132. For example, one of the controls provides for a moving or shifting of the position of the displayed image in the horizontal direction, parallel to the X-axis. The computer 134 responds to this request by directing the delay unit 124 to impart a fixed amount of delay to the presentation of each of the scan lines 140. Increasing the delay displaces the normal image of FIG. 9 to the right, and decreasing the delay displaces the normal image of FIG. 9 to the left. Two other input controls of the computer 134 enable the person operating the microscopy system 20 select the right tilt of FIG. 10 or the left tilt of FIG. 11. A further input control to the computer 134 enables the person operating the microscopy system 20 to select the three-dimensional presentation which involves concurrent generation of right-tilted and left-tilted images as will be explained in FIGS. 14–15.

Figure 14:
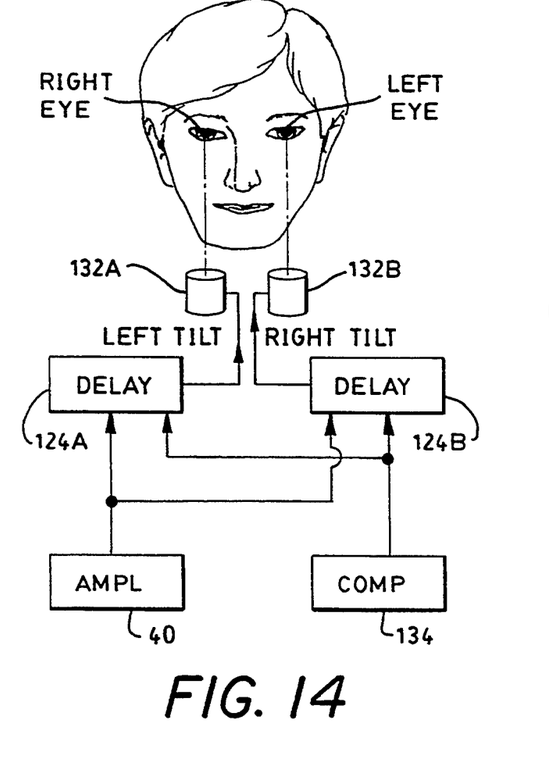
FIG. 14 shows an implementation of the three-dimensional presentation by means of a pair of displays.

In FIG. 14, there is shown one embodiment of the invention for accomplishing the three-dimensional presentation. This embodiment employs two of the displays 132 of FIG. 8, the two displays being identified in FIG. 14 as a display 132A for providing a left-tilted presentation and a display 132B for providing a right-tilted presentation. Two of the variable delay units 124 of FIG. 8 are employed in FIG. 14, the two delay units being identified as delay unit 124A and delay unit 124B. The amplifier 40 provides its output signals to both of the delay units 124A and 124B. Similarly, output command signals of the computer 134 are applied to both of the delay units 124A and 124B. The delay unit 124 connects with the display 132A, and is employed for imparting the appropriate set of delays for tilting a displayed image to the left. The delay unit 124B is coupled to the display 132B and is employed for tilting the displayed image to the right. The two displays 132A and 132B may be miniaturized so as to facilitate simultaneous viewing of the two displays by a person.

The left-tilt display 132A is positioned so as to be viewed by the right eye of the person, and the right-tilt display 132B is positioned so as to be viewed by the left eye of the person. The two views are combined in the persons brain to give the perception of a single image viewed in three-dimensions with the right eye seeing what appears to be a right side of the image and the left eye seeing what appears to be a left side of the image. The person perceives a vanishing point as in a three-dimensional perspective view. A vertical gain control (FIG. 8) on the display 132 allows the image presentation to be expanded or contracted along the Y axis. Each of the displays 132A and 132B is similarly provided with a vertical gain control (not shown) to allow the person to view the display from a location which is perceived as being slightly above the trough 136, in the case of small vertical gain or from a position in front of and well above the trough 136, in the case of high vertical gain. The magnitude of the tilts imparted by the two delay units 124A and 124B may be equal in which case the vanishing point is directly above the image of the trough 136. Alternatively, the amounts of delay imparted by the delay units 124A and 124B may differ, this corresponding to different slopes of the right and the left lines of FIG. 13, in which case the vanishing point appears to be above and off to the side of the image of the trough 136. Increasing the amounts of delay applied to both of the displays 132A and 132B produces increasing amounts of tilt with the resulting impression to the viewer that the trough 136 is close, while a decreasing of the amounts of delay applied to both of the displays 132A and 132B provides the viewer with the impression that the trough 136 is further away.

In view of the fact that the evanescent field decreases in amplitude exponentially with distance from the transducer 86, it may be desirable in certain image processing situations to at least partially correct for the exponential characteristic by providing the amplifier 40 with a logarithmic characteristic resulting in a more linear relationship between image intensity and depth of surface features of the subject 24. Also, in certain situations it may facilitate perception of certain surface features by replacing the straight left and right tilt lines of FIG. 13 with curved lines (not shown) to distort the three-dimensional presentation for accentuating certain surface features.

Figure 15:
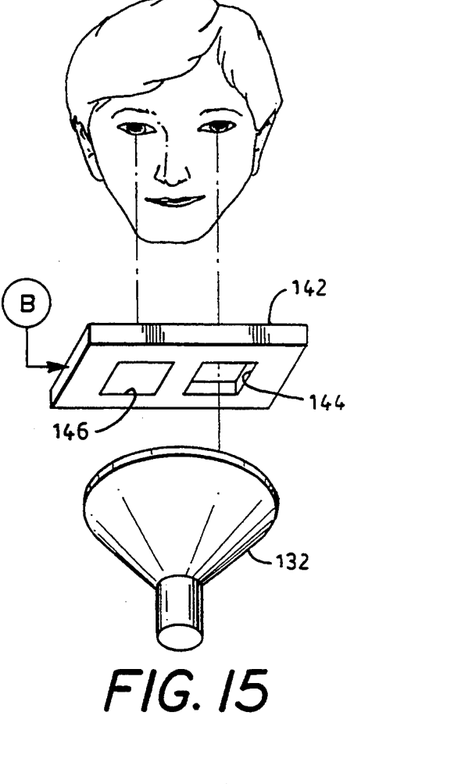
FIG. 15 shows an implementation of the three-dimensional presentation by means of a single display with a shutter.

FIG. 15 shows an alternative embodiment of the invention in which the three-dimensional presentation is accomplished by use of a single display. Namely the display 132 of FIG. 8. This is accomplished by use of a shutter 142 which is activated by a signal at terminal B of the computer 134 (FIG. 8) whereby the computer 134 directs the operation of the shutter 142. The shutter 142 is positioned between the display 132 and the person viewing the display. The shutter 142 has two ports 144 and 146 by which the person can view the display 132. The port 144 is located in front of the left eye, and the port 146 is located in front of the right eye. The shutter 146 operates to open the ports 144 and 146 alternately during operation of the display 132. In this embodiment of the invention, the computer 134 develops a right-tilted presentation on the display 132 and, thereafter, replaces the right-tilted presentation with a left-tilted presentation. The sequence of presentations continues with alternation between the right-tilted and the left-tilted presentations. The computer 134 directs the shutter 142 to open the port 144 to apply the right-tilted presentation to the viewers left eye, at which time the port 146 is closed to prevent the viewers right eye from seeing the display 132. The computer 134 directs the shutter 142 to open the port 146 for applying the left-tilted presentation to the viewers right eye, at which time the port 144 is closed to prevent the viewers left eye from seeing the display 132. Alternate opening and closing of the ports 144 and 146 continues in synchronism with the sequence of the generation of the right-tilted and the left-tilted presentations on the display 132.

The presentations on the display 132 are generated at a sufficiently high rate to be above the flicker rate of the person viewing the presentation. For example, the presentations may be generated at a rate of sixty presentations per second wherein thirty of the presentations are tilted to the right and 30 of the presentations are tilted to the left, the order of the left-tilted and right-tilted presentations being interleaved so that the viewer sees alternately the right and the left tilted presentations at a rate above the viewing flicker rate. Thereby, the viewers brain in the embodiment of FIG. 15 perceives the same image as does the viewers brain in the embodiment of FIG. 14. The discussion of the vanishing points in FIG. 14 applies also to the embodiment of FIG. 15 such that the apparent locations of the vanishing points and the apparent location of the viewer relative to the trough 136 may be controlled by adjustment of the magnitude of the tilt and the vertical gain as has been described for the embodiment of FIG. 14. In terms of enhancement of the perceptual effect, it has been noted that if the perimeter of the display 132 is excluded from the view of the person, such that the person can see only the central portion of the image with peripheral portions being outside of the persons view, then the three-dimensional effect is more pronounced.

The circuitry 22 of FIG. 8 provides also for generation of the three-dimensional presentation digitally, wherein a digital representation of the image data has been stored in the memory 118. This is accomplished as follows. Analog signals outputted by the video amplifier 40 are applied via the converter 120 to the memory 118. The converter 120 converts the analog signals to digitally formatted signals which are stored in the memory 118. Signals of the timing unit 114 drive the address generator 116 in synchronism with the scanning process. The generator 116 addresses the various memory slots of the memory 118 for receipt of the digitized samples of the signals produced by the converter 120. In accordance with the usual practice, the various components of the digital portion of the circuitry 22, including the generator 116, the converters 120 and 122 and the memory 118 receive clock signals from terminal C to operate in synchronism. Also, the clock signals enable the converter 120 to sample the image data at a prescribed rate for generating a high resolution image on the display 132. Upon storage of the complete image within the memory 118, the data can be stored indefinitely until it is desired to present the image on the display 132.

Displaying of the image is accomplished as follows. The address generator 128 produces address signals for reading the stored data out of the memory 118, the read-address signals being applied via the delay unit 126 to the memory 118. Since the electronics employed with the vidicon 28 may not be present, or may be deenergized, during a later time when the data is being read out of the memory 118, a separate clock 130 is provided for generating clock pulse signals at terminal C for operation of the read-address generator 128, as well as for the generating of timing signals at terminal A by the generator 128. This is indicated in FIG. 8 by phantom connections to the terminals A and C. Also, phantom connections are shown from the generator 128 and the converter 122 to the display 132 to indicate that the digital implementation is an alternative embodiment of the invention which may be employed in lieu of the analog implementation. Digital signals outputted from the memory 118 are converted by the converter 122 to analog format and then applied by the converter 122 to the display 132.

The delay unit 126 operates in a fashion analogous to that of the delay unit 124. The computer 134 commands the delay unit 126 to delay the read signal commands of the generator 128 during the outputting of each line scan of the image from the memory 118. The delaying of the outputting of the data to be shown in the successive line scans from the memory 118, by use of increased amounts of delay for each line scan, produces the right tilt of FIG. 10, while the use of decreasing amounts of delay produces the left tilt of FIG. 11. Thus, all of the inventive features disclosed for the analog format including the tilting, horizontal displacement, vertical scaling, and the three-dimensional presentations of FIGS. 14 and 15 are accomplished in the same fashion by use of the digital portion of the circuitry 22 as has been described earlier for the analog portion of the circuitry 22. Suitable display apparatus for implementing the functions of the display 132 (FIG. 8) are disclosed in the aforementioned U.S. Pat. No. 4,681,451 to Guerra et al.

Figure 16:
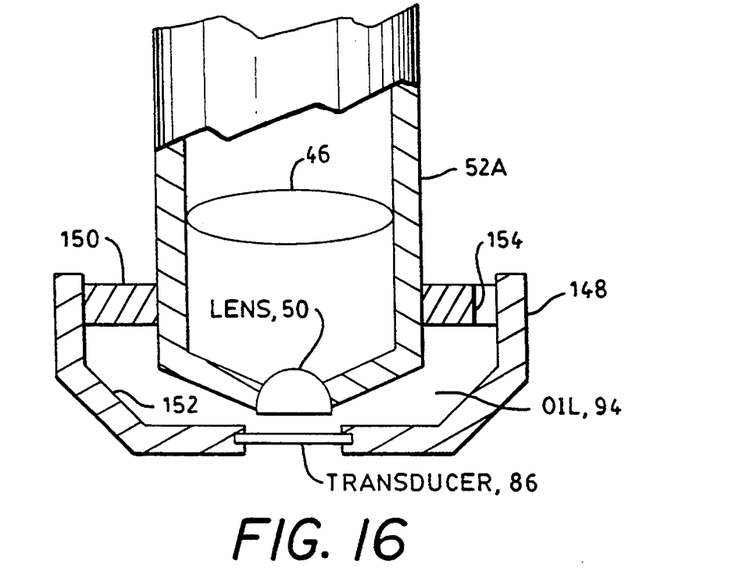
FIG. 16 shows a modification of a microscope housing of FIG. 1 which includes a frame for supporting a transducer and for defining a chamber for holding liquid.

FIG. 16 shows an alternative configuration to the microscope housing 52 of FIG. 1, the microscope housing 52A of FIG. 16 including a frame 148 for holding the transducer 86. A mount 150 secures the frame 148 to the housing 52A and positions the frame 148 so as to provide a chamber 152 for liquid 94 such as oil. The chamber 152 extends between the lens 50 and the transducer 86 as a narrow passage to allow flexing of the transducer 86 as has been described above with reference to FIG. 3. A passage 154 in the mount 150 provides access to the chamber 152 for introduction of the liquid 94. The housing 52A with the frame 148 provides convenience in use of the microscope by allowing the transducer 86 to be employed as a part of the microscope, thereby allowing the subject 24 to be positioned independently of the transducer 86.

The foregoing description has shown the utility of the invention in providing for a three-dimensional viewing of a subject while facilitating the use of a transducer at the interface between the subject and the microscope.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A flexible plate for use with a photon-tunneling microscope operative with an evanescent mode of radiation propagation, the microscope having a piano-convex objective lens, the flexible plate being configured for mounting between a planar surface of said lens and a subject to be viewed by the microscope, the plate comprising a layer of an optically transmissive medium, a flexibility of said plate allowing said plate to conform to contours in a surface of the subject, a surface of said plate facing the subject having a hardness which resists intrusions of typographic features of the subject into the plate surface.

2. A plate according to claim 1 wherein
   during use with said objective lens, a layer of liquid is disposed between said lens and said plate, the liquid providing a continuum of optically transmissive medium from said lens to said plate during a flexing of said plate; and an index of refraction of said plate is approximately equal to an index of refraction of said lens and of said liquid to cooperate with said lens to enable internally reflected radiation of said microscope to be reflected from a surface of said plate facing the subject.

3. A plate according to claim 2 further comprising an image intensity scale formed within said plate.

4. A plate according to claim 3 wherein said scale is configured as a depression in said plate surface, the depression having a sequence of steps extending with increasing depth into said plate, the steps being of differing distance from the subject upon an abutment of the subject against the plate surface, the differing distances altering interaction with the evanescent mode stepwise to provide a staircase variation in image intensity at the location of an image of the scale in an image plane of said optical system.

5. A microscopy system according to claim 4 wherein said scale image is displaced to a side region of said plate to provide an unobstructed view of an image of the subject in an image plane of the microscope.

* * * * *